United States Patent
Buick et al.

(10) Patent No.: US 8,156,265 B2
(45) Date of Patent: Apr. 10, 2012

(54) DATA PROCESSOR COUPLED TO A SEQUENCER CIRCUIT THAT PROVIDES EFFICIENT SCALABLE QUEUING AND METHOD

(75) Inventors: Tim J. Buick, Ottawa (CA); John F. Pillar, Ottawa (CA)

(73) Assignee: Freescale Semiconductor, Inc., Austin, TX (US)

( * ) Notice: Subject to any disclaimer, the term of this patent is extended or adjusted under 35 U.S.C. 154(b) by 380 days.

(21) Appl. No.: 12/476,586

(22) Filed: Jun. 2, 2009

(65) Prior Publication Data

US 2010/0306483 A1    Dec. 2, 2010

(51) Int. Cl.
*G06F 12/02* (2006.01)
*G06F 3/00* (2006.01)

(52) U.S. Cl. ............ 710/52; 710/54; 370/235; 370/412; 711/156

(58) Field of Classification Search ............ 710/52, 710/54; 370/235, 412
See application file for complete search history.

(56) References Cited

U.S. PATENT DOCUMENTS

| | | | |
|---|---|---|---|
| 6,724,767 B1 * | 4/2004 | Chong et al. | 370/412 |
| 7,236,489 B1 | 6/2007 | Wyatt | |
| 7,280,477 B2 * | 10/2007 | Jeffries et al. | 370/235 |
| 7,334,102 B1 | 2/2008 | Conway | |
| 7,366,865 B2 | 4/2008 | Lakshmanamurthy et al. | |
| 7,392,279 B1 * | 6/2008 | Chandran et al. | 709/200 |
| 7,986,706 B2 * | 7/2011 | Yip et al. | 370/412 |

* cited by examiner

*Primary Examiner* — Tammara Peyton

(57) ABSTRACT

A data processor includes a single-token-record memory, a sequence circuit, and a memory controller. The single-token-record memory has a plurality of first storage locations. The sequencer circuit is coupled to the single-token-record memory. The sequencer circuit, responsive to a request to place a token in a tail-end of a queue, either stores said token into one of the plurality of first storage locations if the single-token-record memory stores no greater than a predetermined number of tokens associated with the tail-end of the queue, or stores the token with at least one additional token and a pointer to a next storage location into one of a plurality of second storage locations otherwise. The memory controller is coupled to the sequencer circuit to store the token with the at least one additional token and the pointer in a location of a multi-token-record memory having the plurality of second storage locations.

20 Claims, 7 Drawing Sheets

DATA PROCESSOR COUPLED TO A SEQUENCER CIRCUIT THAT PROVIDES EFFICIENT SCALABLE QUEUING AND METHOD

FIELD OF THE DISCLOSURE

The invention relates generally to data processors, and more particularly to queue mechanisms for data processors.

BACKGROUND

Data processors use queuing mechanisms to control the flow of data within the system in a number of different scenarios, such as in a system having multiple processor cores and/or multiple functional blocks for manipulating data. Almost all queuing mechanisms that manage a large number of queues such as those offering per-flow queuing, employ a "linked-list" structure of shared resources to achieve dynamic scaling of queues. Furthermore, queuing mechanisms are often designed for a paradigm in which "tokens" or descriptors are stored within the queue structure rather than the actual queued entity in order to improve performance, fault tolerance, and simplicity of the queue structure. Tokens can be uniform size descriptions of references to the data or entity being queued. However, even with scalable storage of tokens stored in queues, the movement of the tokens can still be a bottleneck between the processor and the memory system.

BRIEF DESCRIPTION OF THE DRAWINGS

The present disclosure may be better understood, and its numerous features and advantages made apparent to those skilled in the art by referencing the accompanying drawing, in which like reference numbers indicate similar or identical items.

DETAILED DESCRIPTION

Figure 1:
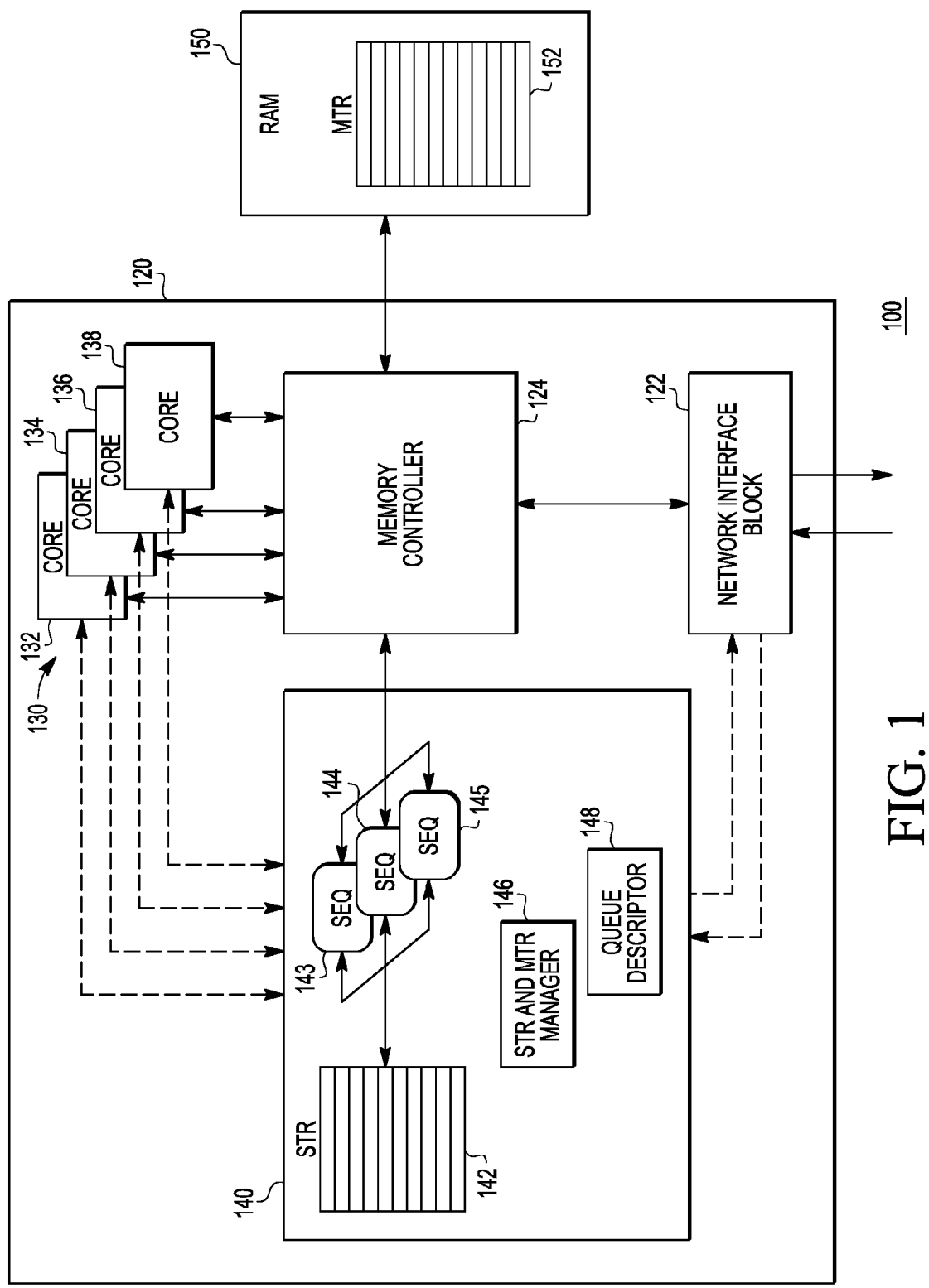
FIG. 1 illustrates a block diagram of a data processor according an embodiment of the present invention.

FIG. 1 shows a block diagram of a data processor 100 including an integrated circuit 120 and a memory 150 according to an embodiment of the present invention. The integrated circuit 120 includes a network interface block 122, a memory controller 124, a plurality of processor cores 130, and a queuing mechanism 140. In different embodiments, the plurality of processor cores 130 can include any multiple of processors, such as processor cores 132, 134, 136, and 138 shown in FIG. 1. The queuing mechanism 140 includes a single-token-record memory 142, sequencer circuits 143, 144, and 145, a single-token-record and multi-token-record manager 146, and queue descriptors 148. The memory 150 includes a multi-token-record memory 152.

The network interface block 122 receives data packets from other devices in a network in communication with the data processor 100. Also, the network interface block 122 stores the data packets in memory locations associated with the data processor 100, such as the memory 150. The network interface block 122 creates a token for each data packet received in data processor 100. The token can be a packet descriptor for the associated data packet, such as a description of where the packet is stored in memory, or other indication useful in accessing the data in memory 150. Additionally, the network interface block 122 has ownership of the specific memory locations that are used to store the received data packets, and the network interface block 122 transfers ownership or the right to access the different memory locations through the passing of tokens.

The memory controller 124 allows communication between the different components of the data processor 100. The memory controller 124 provides an path between the network interface block 122 and the memory 150 to store the data packets, and a path between the network interface block 122 and the queuing mechanism 140 to deliver or accept tokens to or from the queuing mechanism 140. Also, the memory controller 124 provides a path for the processor cores 130 to access the data stored in the memory 150, and a path between the processor cores 130 and the queuing mechanism 140 to provide, deliver, or accept tokens to or from the queuing mechanism 140. The memory controller 124 provides a path between the queuing mechanism 140 and the memory 150 for the access of multi-token-record memory 152. In another embodiment, the network interface block 122 and the processor cores 130 each have direct interfaces with the queuing mechanism 140 for passing tokens, as indicated by the dashed lines.

The processor cores 130 request tokens from the queuing mechanism 140 such that one of the processor cores 132, 134, 136, or 138 can retrieve and process the data associated with the tokens. The queuing mechanism 140 controls the queuing of the tokens associated with data stored in the memory 150.

During operation, a data packet is received at the network interface block 122, and is passed, via the memory controller 124, to the memory 150. Then the network interface block 122 creates a token associated with the received data packet, and sends a token enqueue request to the sequencer circuits 143, 144, and 145 via the memory controller 124. As the token enqueue request is acted upon by one of the sequencer circuits 143, 144, or 145, a token associated with the received data packet is added to the tail-end of a queue in the queuing mechanism 140. The token is placed in the tail-end of the queue by either being written by one of the sequencer circuits 143, 144, and 145 to a memory location within the single-token-record memory 142 or to a memory location within the multi-token-record memory 152. The sequencer circuits 143, 144, and 145 are allocated the right to use specific single-token records and multi-token-records by the single-token-record and multi-token-record manager 146.

If the token is written to a memory location within the multi-token-record memory 152, the token is grouped with a plurality of tokens currently stored in the single-token-record memory 142 and a pointer to a next memory location within the multi-token-record memory 152. The number of tokens that are grouped together and transferred from the single-token-record memory 142 to the multi-token-record memory 152 is determined based on a most efficient width of the memory controller 124, of a bus connecting the memory controller 124 to the queuing mechanism 140, and/or of a bus connecting the memory controller 124 to the multi-token-record memory 152. For example, if the most efficient width from the queuing mechanism 140 to the multi-token-record memory 152 is sixty-four bytes and each token is sixteen bytes, the number of tokens that can be efficiently written to the multi-token-record memory is three tokens along with a pointer to a next memory location within the multi-token-record memory. The queue descriptor 148 stores a linked-list of pointers associated with the memory locations of the tokens in the queue. For example, once stored in a memory location of either the single-token-record memory 142 or the multi-token-record memory 152, a pointer associated with the token received at the sequencer circuits 143, 144, and 145 is added to the tail-end of a linked-list in the queue descriptor 148 for the associated queue.

Upon tokens being transferred from the single-token-record memory 142 to the multi-token-record memory 152, the sequencer circuit 143, 144, or 145 returns ownership of the single-token-record to the single-token-record and multi-token-record manager 146. The single-token-record and multi-token-record manager 146 can then allocate the ownership to a different queue descriptor or to the queue descriptor 148 upon arrival of another token from the network interface block 122.

If a dequeue request is made for data by the processor cores 130, the queuing mechanism 140 dequeues a token associated with the data requested from the head-end of the queue. During the dequeuing process, if there is at least one token stored within a memory location of the single-token-record memory 142, the token at the head-end of the queue is passed to the data processor cores 130, so that one of the processor cores 132, 134, 136, or 138 can request the data to be processed based on the token. Otherwise, a plurality of tokens stored in the next memory location of the multi-token-record memory 152 is read from the multi-token-record memory and stored in a plurality of memory locations in the single-token-record memory 142 associated with the head-end of the queue. Upon the tokens being stored in the memory locations of the single-token-record memory 142, the requested tokens are passed, via one of the sequencer circuits 143, 144, or 145 and the memory controller 124, to one of the processor cores 132, 134, 135, or 138. Once the requested tokens have been passed to the processor cores 130, a determination is made whether at least one token is stored in the memory locations of the single-token-record memory 142 associated with the head-end of the queue. If there is not at least one token stored, a plurality of tokens is read from the next memory location in the multi-token-record memory 152 to the single-token-record memory 142 in preparation of the next process request from the processor cores 130.

Figure 2:
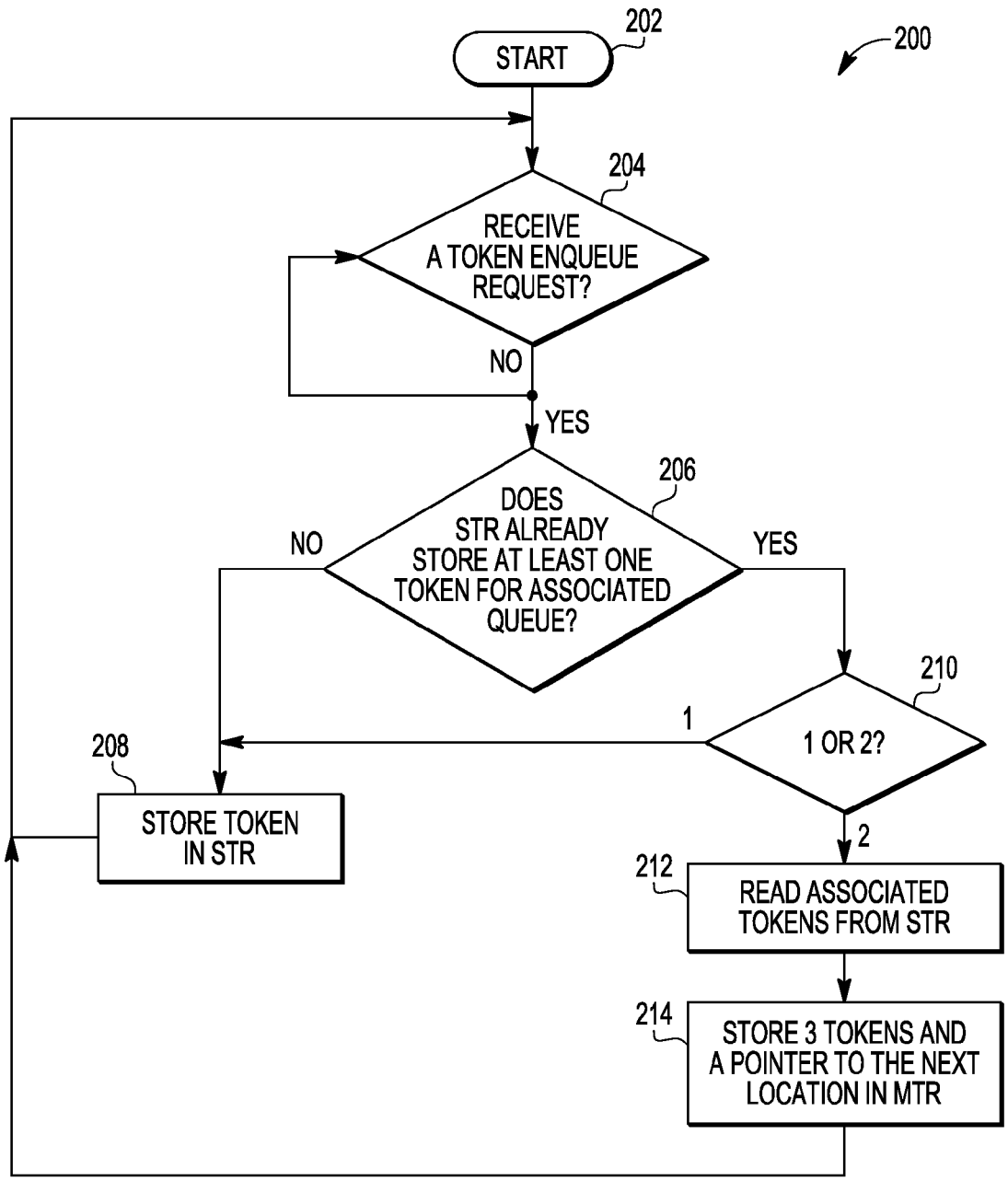
FIG. 2 illustrates a flow diagram of a method for enqueuing a token to a queue associated with the data processor of FIG. 1.

FIG. 2 shows a flow diagram of a method 200 for enqueuing a token to a queue associated with the data processor 100 of FIG. 1. The method begins at block 202. At block 204, a determination is made whether a token enqueue request is received. Upon the token enqueue being received, a determination is made whether a single-token-record memory associated with a tail-end of a queue already stores at least one token at block 206. If the single-token-record memory does not currently store at least one token, then a token associated with a data packet is stored in a memory location within the single-token-record memory at block 208, and the flow continues as stated above at block 204. If at least one token is stored in the single-token-record memory, a determination is made whether the single-token-record memory already stores no greater than a predetermined number of tokens at block 210. In the illustrated embodiment, the predetermined number of tokens is one token. Thus, the determination is whether the single token memory stores one or two tokens.

If the single-token-record memory does not currently store more than the predetermined number of tokens, the token is stored in the single-token-record memory at block 208, and the flow continues as stated above at block 204. Otherwise, a plurality of tokens currently stored in the single-token-record memory is read from the single-token-record memory at block 212. At block 214, the plurality of tokens read from the single-token-record memory, the token associated with the data packet, and a pointer to a next location in a multi-token-record memory are stored in a memory location of the multi-token-record memory, and the flow continues as stated above at block 204. In the illustrated embodiment, three tokens and a pointer to the next memory location in the multi-token-record memory are stored in a single multi-token-record of the multi-token-record memory.

Figure 3:
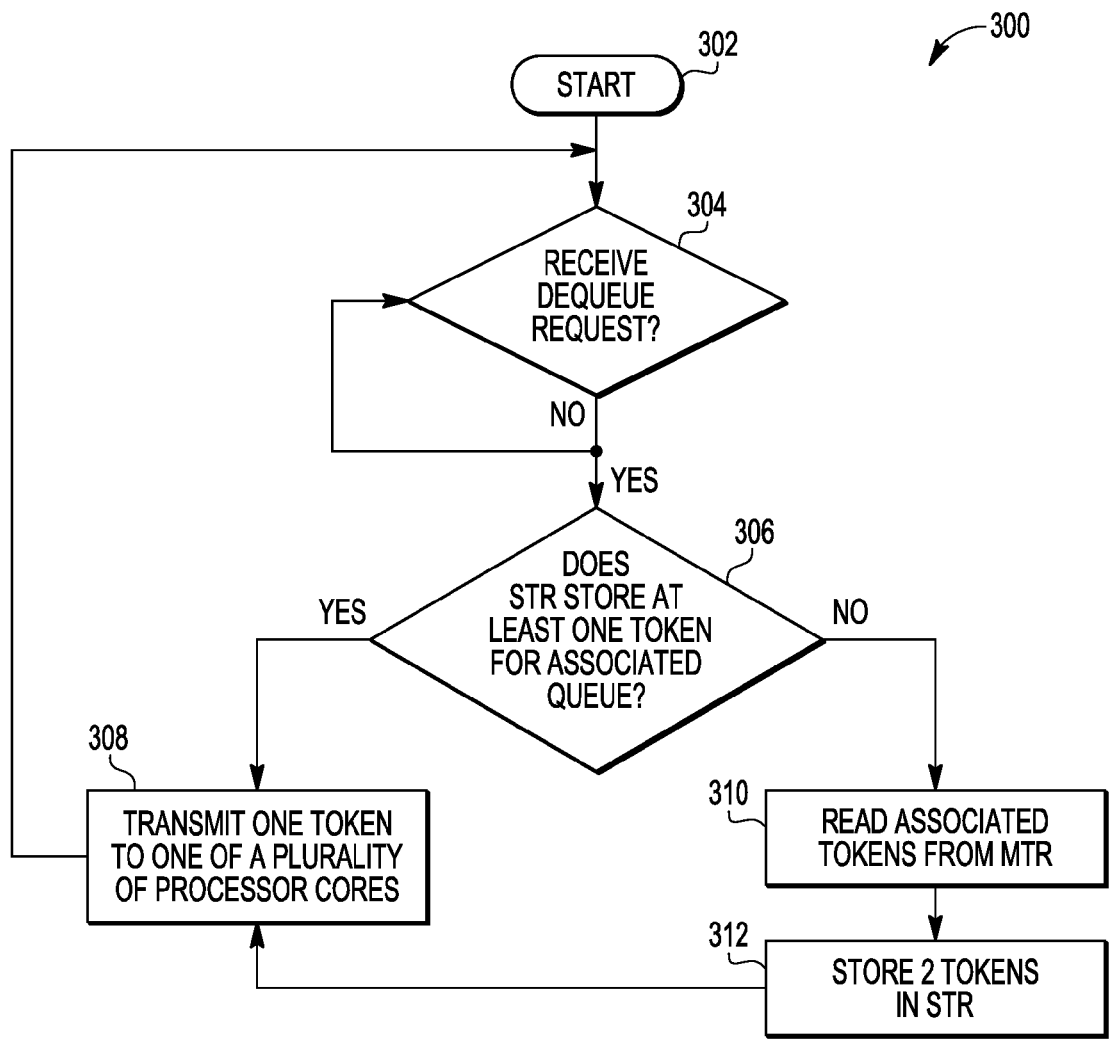
FIG. 3 illustrates a flow diagram of a method for dequeuing a token from the queue associated with the data processor of FIG. 1.

FIG. 3 shows a flow diagram of a method 300 for dequeuing a token from the queue associated with the data processor 100 of FIG. 1. The flow begins at block 302. At block 304, a determination is made whether a request to dequeue a token has been received. Upon a dequeue request being received, the dequeue request is assigned to a sequencer circuit and a determination is made whether a single-token-record memory associated with a head-end of a queue is currently storing more than a predetermined number of tokens at block 306. In the illustrated embodiment, the predetermined number of tokens is zero tokens.

If the single-token-record memory is currently storing more than the predetermined number of tokens, one token is passed from the single-token-record associated with the head-end of the queue to one of a plurality of processor cores at block 308, and the flow continues as stated above at block 304. However, if the single-token-record memory is not currently storing more than the predetermined number of tokens, a plurality of tokens associated with the head-end of the queue are read from the multi-token-record memory and stored in the single-token-record memory at block 310, and the flow continues as stated above at block 308.

Figure 4:
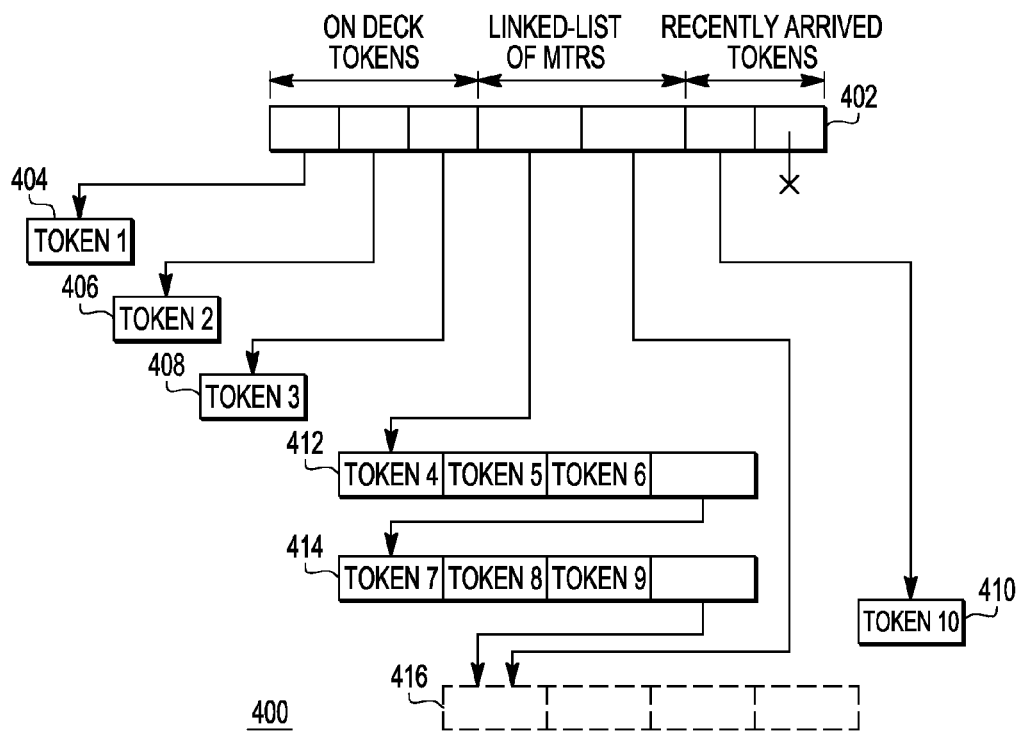
FIG. 4 illustrates a block diagram of a token queue structure in an first state within the data processor of FIG. 1.

FIG. 4 shows a block diagram of token queue 400 in a first state within the data processor 100 of FIG. 1. In the first state, the token queue 400 includes a queue descriptor 402, single-token-records 404, 406, 408, and 410, and multi-token-records 412, 414, and 416. The queue descriptor 402 can reference up to three "on deck" tokens at the head-end of the queue descriptor, a linked-list of multi-token-records, and up to two "recently arrived" tokens at the tail-end of the queue descriptor. The queue descriptor 402 points to the single-token-records 404, 406, 408, and 410, and the multi-token-records 412, 414, and 416.

In the illustrated embodiment, the "on deck" tokens are individually stored in different memory locations within a single-token-record memory, such as the single-token-records 404, 406 and 408, and the queue descriptor 402 stores pointers associated with the locations of the "on deck" tokens of the queue. The linked-list of multi-token-records are associated with groups of three tokens in a single memory location of a multi-token-record memory, such as the multi-token-records 412, 414 and 416, and the queue descriptor 402 stores pointers associated with locations of the first and last storage locations of the multi-token-record memory that are linked to the linked-list of multi-token-records of the queue. The "recently arrived" tokens are individually stored in different memory locations within the single-token-record memory, such as the single-token-record 410, and the queue descriptor 402 stores pointers associated with the locations of the "recently arrived" tokens of the queue.

In the first state, a first token is stored in the single-token-record 404, a second token is stored in the single-token-record 406, and a third token is stored in single-token-record 408. The first, second, and third tokens are discretely linked as the "on deck" tokens in the head-end of the queue descriptor 402. Additionally, fourth, fifth, sixth tokens, and a pointer to multi-token-record 414 are stored in multi-token-record 412. Also, seventh, eighth, and ninth tokens, and a pointer to multi-token-record 416 are stored in multi-token-record 414. The fourth, fifth, sixth, seventh, eighth, and ninth tokens are linked as the link-list of multi-token records in the queue descriptor 402. A tenth token is stored in single-token-record 410, and discretely linked as a "recently arrived" token in the tail-end of the queue descriptor 402.

Figure 5:
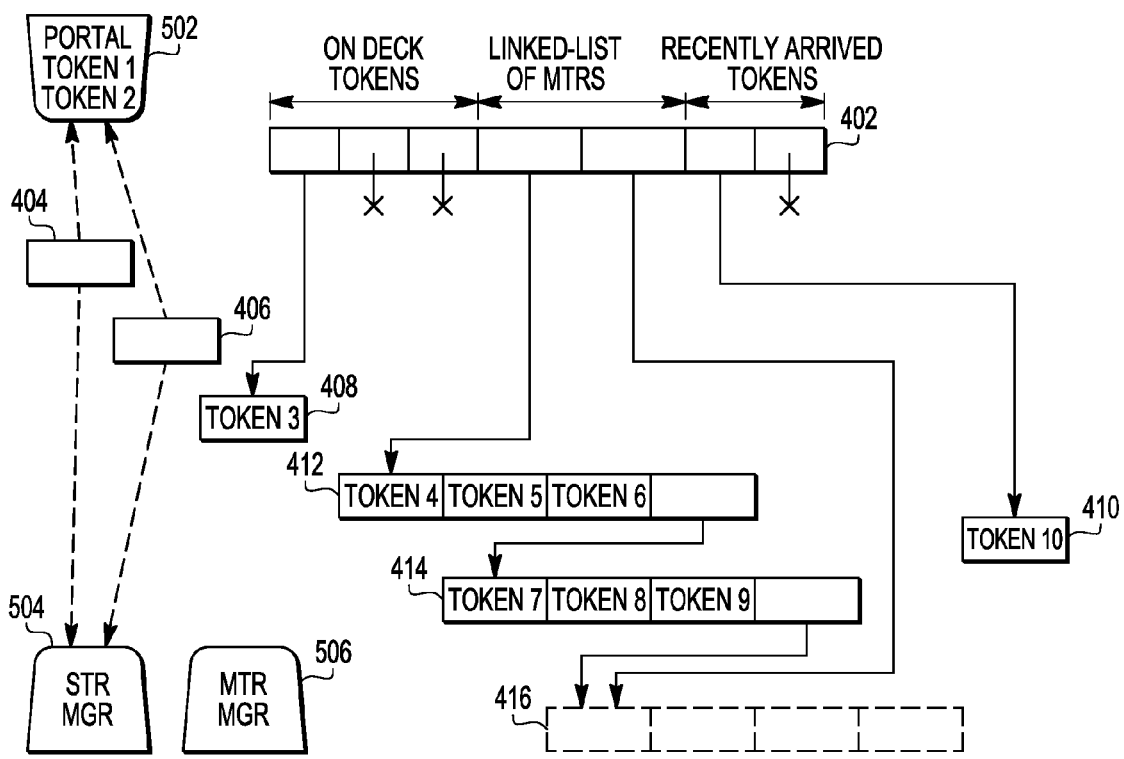
FIG. 5 illustrates a block diagram of the token queue structure in a second state after a first dequeue action within the data processor of FIG. 1.

FIG. 5 shows a block diagram of a token queue 500 in a first dequeuing step within the data processor 100 of FIG. 1. The token queue 500 is similar to the token queue 400 of FIG. 4 and like numbers indicate similar items that carry out similar functions. The token queue 500 also includes a portal 502, a single-token-record manager 504, and a multi-token-record manager 506. In different embodiments, the single-token-record manager 504 and the multi-token-record manager 506 can be separate devices as illustrated in FIG. 5, or can be combined in a single device as illustrated as single-token-record and multi-token-record manager 146 of FIG. 1. A request is made to process two tokens within the data processor 100. Since the first token stored in the single-token-record memory 404 and the second token stored in the single-token-record memory 406 are at the head-end of the queue descriptor 402, these tokens are passed to the portal 502 as indicated by the dashed lines in FIG. 5.

Upon the first and second tokens being passed to the portal 502, the token queue 500 returns ownership of the single-token-records 404 and 406 to the single-token-record manager 504. Thus, the queue descriptor 402 is updated such that only the third token, stored in the single-token-record 408, is linked to the first "on deck" portion of the queue descriptor, and the second and third "on deck" portions do not point to a memory location and/or a storage location. The ownership of the multi-token-records 412, 414, and 416 is not change in the multi-token-record manager 506. Thus, the fourth, fifth, and sixth tokens, and the pointer to multi-token-record 414 are still stored in multi-token-record 412. Also, the seventh, eighth, and ninth tokens, and the pointer to multi-token-record 416 are still stored in multi-token-record 414. The tenth token is still stored in single-token-record 410. Thus, the pointers within the linked-list multi-token-records portion and the "recently arrived" tokens portion of the queue descriptor 402 remain the same.

Figure 6:
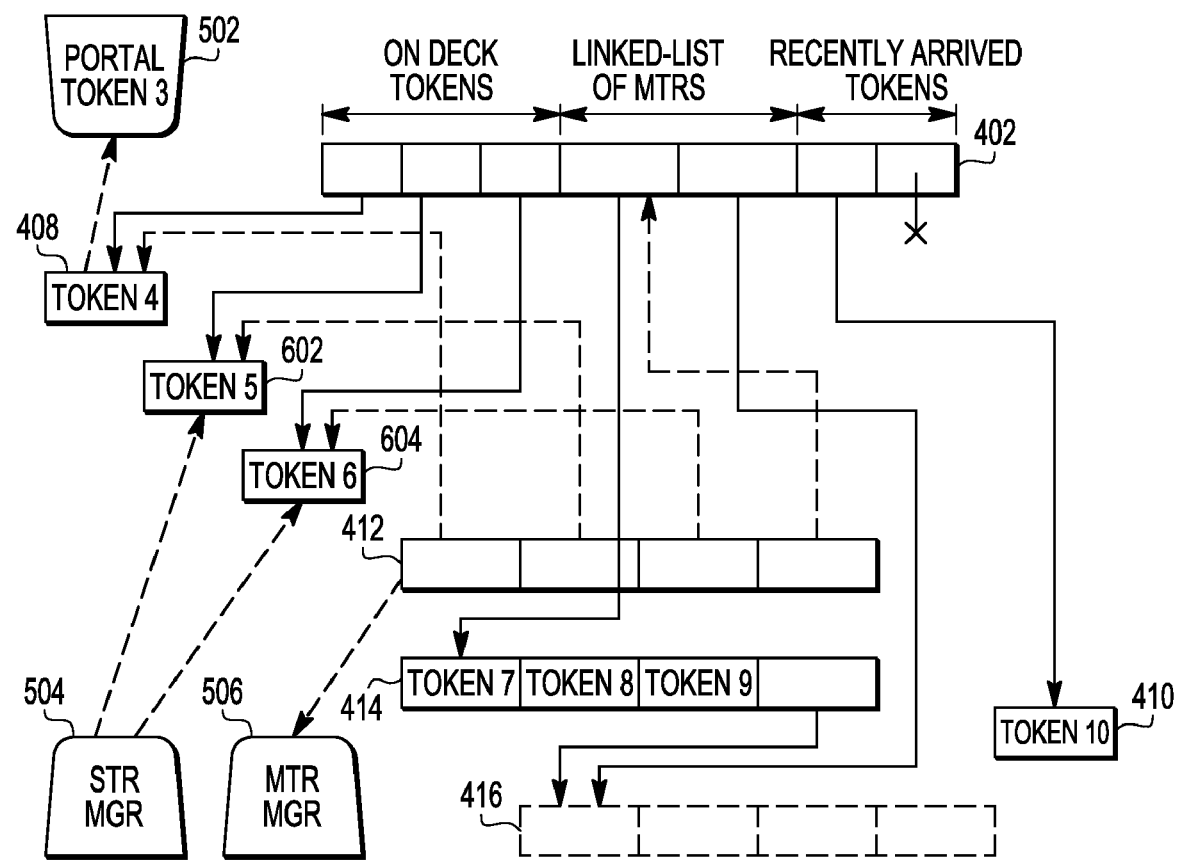
FIG. 6 illustrates a block diagram of the token queue structure in a third state after a second dequeue action within the data processor of FIG. 1.

FIG. 6 shows a block diagram of a token queue descriptor 600 in a second dequeuing step within the data processor 100 of FIG. 1. The token queue 600 is similar to the token queue 500 of FIG. 5 and like numbers indicate similar items that carry out similar functions. The token queue 600 also includes single-token-records 602 and 604. A request is made to dequeue a token within the token queue 600, thus the third token stored in the single-token-record 408 is passed to the portal 502 as indicated by the dashed line in FIG. 6. Upon the third token being sent to the portal 502, the single-token-record manager 504 allocates ownership of the single-token-records 602 and 604 to the token queue 600.

Then the fourth, fifth, and sixth tokens are read from the multi-token-record 412, and stored individually into the single-token-records 408, 602, and 604. Additionally, the pointer from the queue descriptor 402 to the multi-token-record 414 is removed, and other pointers in the queue descriptor are updated based on the single-token-records and multi-token-records to which the queue descriptor has ownership. For example, the pointers in the "on deck" portion of the queue descriptor 402 points to the single-token-records 408, 602, and 604, and the first pointer in the linked-list multi-token-records portion of the queue descriptor 402 points to the multi-token-record 414. The token queue 600 returns ownership of the multi-token-record 412 to the multi-token-record manager 506. Therefore, the fourth token is stored in the single-token-record 408, the fifth token is stored in the single-token-record 602, and the sixth token is stored in the single-token-record 604. Also, the seventh, eighth, and ninth tokens, and the pointer to multi-token-record 416 are stored in multi-token-record 414. The tenth token is stored in single-token-record 410.

Figure 7:
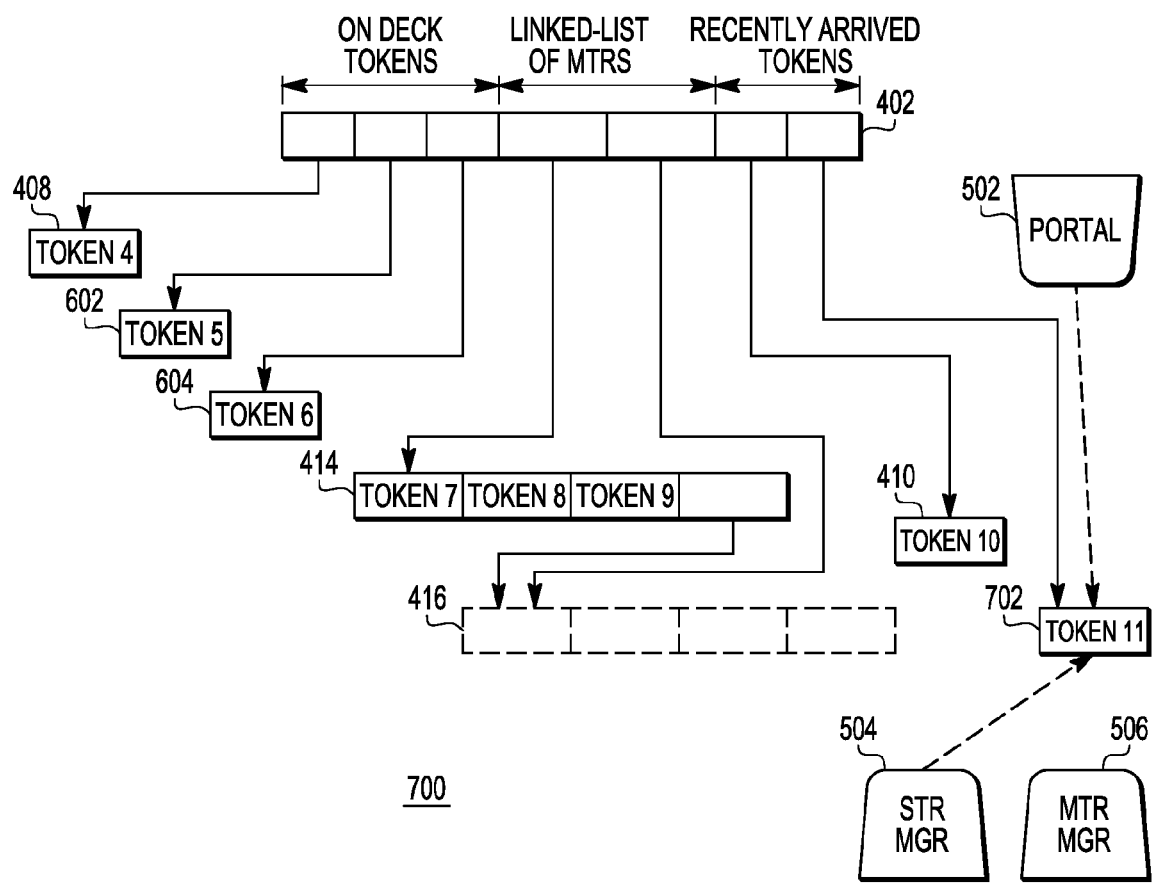
FIG. 7 illustrates a block diagram of the token queue structure in a fourth state after a first enqueue action within the data processor of FIG. 1.

FIG. 7 shows a block diagram of the token queue 700 in a first enqueuing step within the data processor 100 of FIG. 1. The token queue 700 is similar to the token queue 600 of FIG. 6 and like numbers indicate similar items that carry out similar functions. The token queue 700 also includes a single-token-record 702. The fourth token is stored in the single-token-record 408, the fifth token is stored in the single-token-record 602, and the sixth token is stored in the single-token-record 604. Also, the seventh, eighth, and ninth tokens, and the pointer to multi-token-record 416 are stored in multi-token-record 414. The tenth token is stored in single-token-record 410.

During the enqueuing, a request to enqueue a token is received at the token queue 700. Upon receiving the enqueue request, the single-token-record memory manager 504 allocates ownership of the single-token-record 702 to the token queue 700. The received eleventh token is then stored in the single-token-record 702, and the pointer for the second portion of the "recently arrived" tokens points to the single-token-record 702.

Figure 8:
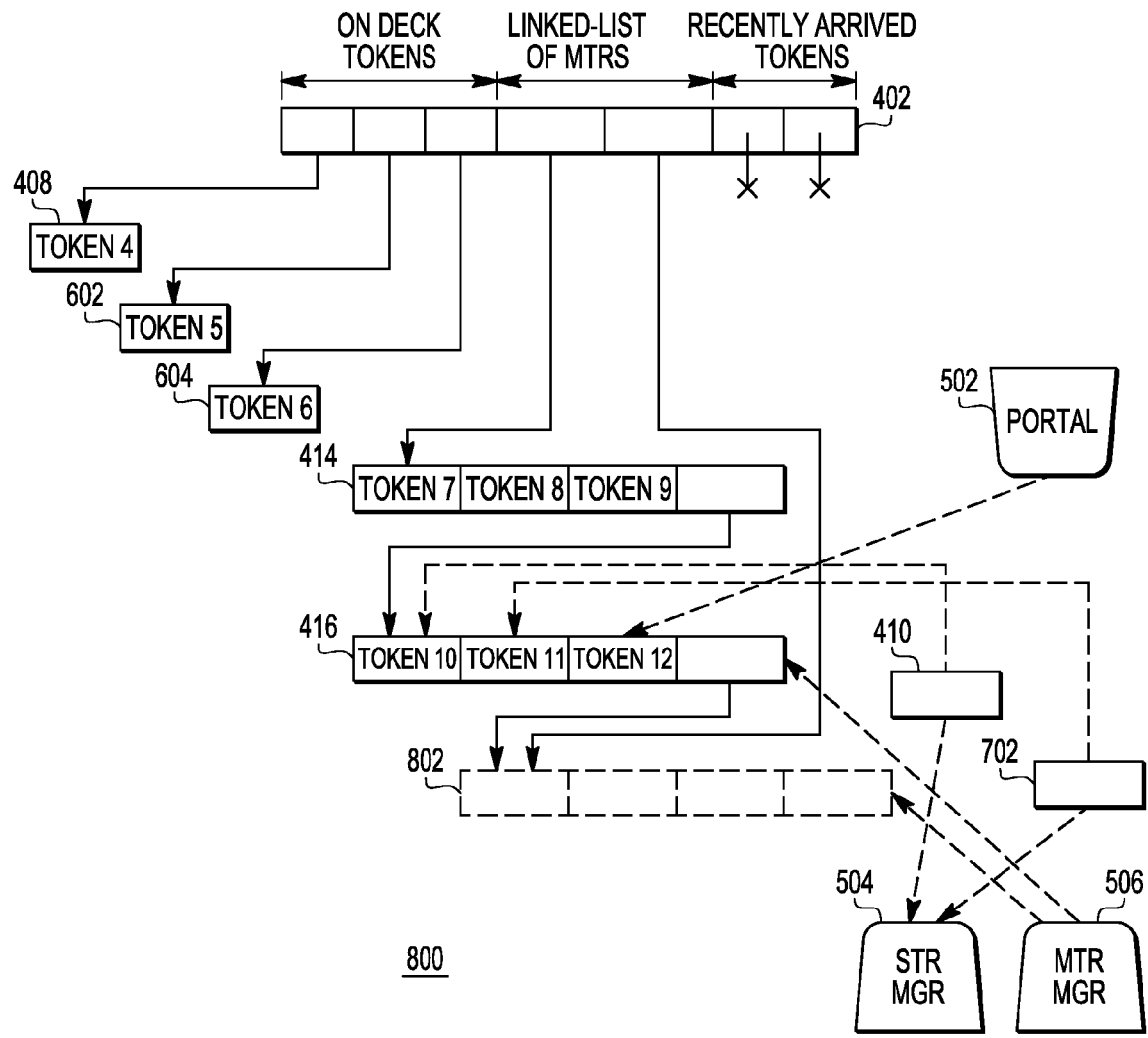
FIG. 8 illustrates a block diagram of the token queue structure in a fifth state after a second enqueue action within the data processor of FIG. 1.

FIG. 8 shows a block diagram of the token queue 800 in a second enqueuing step within the data processor 100 of FIG. 1. The token queue 800 is similar to the token queue 700 of FIG. 7 and like numbers indicate similar items that carry out similar functions. The token queue 800 also includes a multi-token-record 802. At this step, another request to enqueue a token is received, thus a twelfth token associated with the packet is passed to the queue. However, the tail-end of the queue already has a token stored in each of the single-token-records 410 and 702. Thus, the tenth and eleventh tokens are read from the single-token-records 410 and 702 and are stored along with the newly arrived twelfth token and a pointer to the multi-token-record 802 in the multi-token-record 416. The multi-token-record manager 504 allocates ownership of the multi-token-record 802 to the token queue 800. Upon the tenth and eleventh tokens being passed to the multi-token-record 416, the token queue 800 returns the ownership of the single-token-records 410 and 702 to single-token-record manager 504, and the pointers in the queue descriptor 402 are updated accordingly.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A data processor comprising:
   a single-token-record memory having a plurality of first storage locations;
   a sequencer circuit coupled to said single token-record memory, wherein said sequencer circuit, responsive to a request to place a token in a tail-end of a queue, stores said token into one of said plurality of first storage locations if said single-token-record memory stores no greater than a predetermined number of tokens associated with said tail-end of said queue, and stores said token with at least one additional token and a pointer to a next storage location into one of a plurality of second storage locations if said single-token-record memory stores more than the predetermined number of tokens; and
   a memory controller coupled to said sequencer circuit, the memory controller to provide a communication path through which the sequencer stores said token with said at least one additional token and said pointer in a location of a multi-token-record memory when said single-token-record memory stores more than the predetermined number of tokens, said multi-token-record memory having said plurality of second storage locations.

2. The data processor of claim 1 further comprising:
   a plurality of processor cores coupled to said sequencer circuit and said memory controller; and
   wherein said sequencer circuit provides a selected token to one of said plurality of processor cores to cause said one of said plurality of processor cores to process data associated with said selected token.

3. The data processor of claim 1 further comprising:
   a network interface block coupled to said sequencer circuit, and said memory controller, and said network interface block having an input for receiving a packet from a network, and in response thereto, providing said packet to said memory controller for storage in a memory and providing said token to said sequencer circuit.

4. The data processor of claim 3 wherein said memory further includes said multi-token-record memory.

5. The data processor of claim 4 wherein said single-token-record memory, said sequencer circuit, said memory controller, and said network interface block are formed on a single integrated circuit, and wherein said memory is external to said single integrated circuit.

6. The data processor of claim 1 wherein a number of tokens included in said plurality of tokens is determined by a width of an optimal transaction of a bus between said memory controller and said multi-token-record memory.

7. The data processor of claim 1 wherein said predetermined number of tokens is one token.

8. The data processor of claim 1 wherein said at least one additional token is two additional tokens.

9. A data processor comprising:
   a single-token-record memory having a plurality of first storage locations;
   a sequencer circuit coupled to said single-token-record memory, wherein said sequencer circuit, responsive to a request to dequeue a token from a head-end of a queue, reads said token associated with said data packet from one of said plurality of first storage locations if said single-token-record memory stores more than a predetermined number of tokens associated with said head-end of said queue, and reads said token along with at least one additional token from one of a plurality of second storage locations and stores said additional tokens in said single-token-record memory, if said single-token-record memory stores less than the predetermined number of tokens; and
   a memory controller coupled to said sequencer circuit, the memory controller to provide a communication path through which the sequencer reads said token and said at least one additional token from said plurality of second storage locations in a multi-token-record memory when said single-token-record memory stores less than the predetermined number of tokens.

10. The data processor of claim 9 further comprising:
    a plurality of processor cores coupled to said sequencer circuit and said memory controller; and
    wherein said sequencer circuit provides said token to one of said plurality of processor cores to cause said one of said plurality of processor cores to process data associated with said token.

11. The data processor of claim 9 further comprising:
    a network interface block coupled to said sequencer circuit, and said memory controller, and said network interface block having an input for receiving a packet from a network, and in response thereto, providing said packet to said memory controller for storage in a memory and providing said token to said sequencer circuit.

12. The data processor of claim 11 wherein said memory further includes said multi-token-record memory.

13. The data processor of claim 12 wherein said single-token-record memory, said sequencer circuit, said memory controller, and said network interface block are formed on a single integrated circuit, and wherein said memory is external to said single integrated circuit.

14. The data processor of claim 11 wherein a number of tokens included in said token and said additional tokens is determined by a width of an optimal transaction of a bus between said memory controller and said multi-token memory.

15. The data processor of claim 9 wherein said predetermined number of tokens is zero tokens.

16. The data processor of claim 9 wherein said at least one additional token is two additional tokens.

17. A method for controlling queuing in a data processor, the method comprising:
    receiving a token enqueue request;
    transmitting a first token associated with said token enqueue request to a queuing mechanism;
    determining a first number of tokens in a tail-end of a queue associated with said first token stored in a single-token-record memory;
    if said first number is less than or equal to a first predetermined number, storing said first token in said single-token-record memory; and
    if said first number is greater than said first predetermined number, storing said first token with at least one additional token and a pointer to a next storage location in a multi-token-record memory.

18. The method of claim 17 further comprising:
    receiving a request to dequeue a second token from a head-end of said queue;
    determining a second number of tokens in said head-end of said queue and associated with said second token stored in said single-token-record memory;

if said second number is greater than a second predetermined number, transmitting a selected token associated with the data to one of a plurality of processor cores; and if said second number is equal to said second predetermined number, transmitting said selected token associated with the data to one of a plurality of processor cores from said multi-token-record memory, and transferring said at least one additional token from said multi-token-record memory to said single-token-record memory.

19. The method of claim 18 wherein said first predetermined number is one token and said second predetermined number is zero tokens.

20. The method of claim 17 wherein said at least one additional token is two additional tokens.

* * * * *